(12) United States Patent
Chaganti et al.

(10) Patent No.: US 11,301,557 B2
(45) Date of Patent: Apr. 12, 2022

(54) SYSTEM AND METHOD FOR DATA PROCESSING DEVICE MANAGEMENT

(71) Applicant: Dell Products L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: DELL PRODUCTS L.P., Hopkinton, MA (US)

( * ) Notice: Subject to any disclaimer, the term of this patent is extended or adjusted under 35 U.S.C. 154(b) by 206 days.

(21) Appl. No.: 16/516,371

(22) Filed: Jul. 19, 2019

(65) Prior Publication Data

US 2021/0019392 A1     Jan. 21, 2021

(51) Int. Cl.
*G06F 21/45* (2013.01)
*H04L 29/06* (2006.01)
*G06F 21/76* (2013.01)

(52) U.S. Cl.
CPC .......... *G06F 21/45* (2013.01); *H04L 63/0884* (2013.01); *G06F 21/76* (2013.01)

(58) Field of Classification Search
CPC .. G06F 21/45; G06F 21/76; G06F 2221/2141; H04L 63/0884; H04L 63/18; H04L 63/0807
See application file for complete search history.

(56) References Cited

U.S. PATENT DOCUMENTS

| | | | |
|---|---|---|---|
| 5,483,637 A | 1/1996 | Winokur et al. | |
| 5,867,714 A | 2/1999 | Todd et al. | |
| 6,012,152 A | 1/2000 | Douik et al. | |
| 6,205,409 B1 | 3/2001 | Zvonar | |
| 6,317,028 B1 | 11/2001 | Valiulis | |
| 6,473,794 B1 | 10/2002 | Guheen et al. | |
| 6,606,744 B1 | 8/2003 | Mikurak | |
| 6,633,782 B1 | 10/2003 | Schleiss et al. | |
| 6,742,141 B1 | 5/2004 | Miller | |

(Continued)

FOREIGN PATENT DOCUMENTS

| CN | 104395855 A | 3/2015 |
|---|---|---|
| CN | 106533753 A | 3/2017 |

OTHER PUBLICATIONS

"Dell DRAC—Wikipedia"; XP055602141; Mar. 23, 2018; https://en.wikipedia.org/w/index.php?title=Dell_DRAC&oldid=831957421.

(Continued)

*Primary Examiner* — J. Brant Murphy
(74) *Attorney, Agent, or Firm* — Chamberlain, Hrdlicka, White, Williams & Aughtry

(57) ABSTRACT

A data processing device includes primary resources, an out-of-band manager operably connected to the primary resources via an always-on in-band connection, and an authentication engine. The authentication engine obtains, via the always-on in-band connection, an operation request and an authentication token corresponding to the operation request; in response to obtaining the authentication token: obtains a list of authorized operations using the authentication token; makes a determination that an operation indicated by the operation request is allowable based on the list of authorized operations; and performs the operation based on the determination.

12 Claims, 11 Drawing Sheets

(56) References Cited

U.S. PATENT DOCUMENTS

| | | |
|---|---|---|
| 6,774,054 B1 | 8/2004 | Zhang et al. |
| 6,795,935 B1 | 9/2004 | Unkle et al. |
| 6,871,224 B1 | 3/2005 | Chu et al. |
| 7,103,874 B2 | 9/2006 | McCollum et al. |
| 7,222,127 B1 | 5/2007 | Bem et al. |
| 7,334,222 B2 | 2/2008 | Keller |
| 7,370,102 B1 | 5/2008 | Chu et al. |
| 7,490,073 B1 | 2/2009 | Qureshi et al. |
| 7,500,142 B1 | 3/2009 | Cowart et al. |
| 7,516,362 B2 | 4/2009 | Connelly et al. |
| 7,536,595 B1 | 5/2009 | Hiltunen et al. |
| 7,757,124 B1 | 7/2010 | Singh et al. |
| 7,827,136 B1 | 11/2010 | Wang |
| 7,831,693 B2 | 11/2010 | Lai |
| 7,886,031 B1 | 2/2011 | Taylor et al. |
| 7,987,353 B2 | 7/2011 | Holdaway et al. |
| 8,001,527 B1 | 8/2011 | Qureshi et al. |
| 8,166,552 B2 | 4/2012 | Prafullchandra et al. |
| 8,290,970 B2 | 10/2012 | Hohmann |
| 8,386,930 B2 | 2/2013 | Dillenberger et al. |
| 8,401,982 B1 | 3/2013 | Satish et al. |
| 8,583,769 B1 | 11/2013 | Peters et al. |
| 8,639,798 B2 | 1/2014 | Akiyama et al. |
| 8,706,682 B1 | 4/2014 | Blazek et al. |
| 8,826,077 B2 | 9/2014 | Bobak et al. |
| 8,868,987 B2 | 10/2014 | Wagner |
| 8,874,892 B1 | 10/2014 | Chan et al. |
| 8,938,621 B2 | 1/2015 | Mao et al. |
| 8,973,118 B2 * | 3/2015 | Fitzpatrick, III ..... H04L 9/3213 |
| | | 726/7 |
| 8,995,439 B2 | 3/2015 | Field |
| 9,122,501 B1 | 9/2015 | Hsu et al. |
| 9,122,739 B1 | 9/2015 | Yadwadkar et al. |
| 9,201,751 B1 | 12/2015 | Muthirisavenugopal et al. |
| 9,225,625 B1 | 12/2015 | He et al. |
| 9,229,902 B1 | 1/2016 | Leis et al. |
| 9,278,481 B2 | 3/2016 | Hull |
| 9,323,789 B1 | 4/2016 | Elliott, IV |
| 9,355,036 B2 | 5/2016 | Beard et al. |
| 9,384,082 B1 | 7/2016 | Lee et al. |
| 9,542,177 B1 | 1/2017 | Johansson et al. |
| 9,590,849 B2 | 3/2017 | Shakirzyanov et al. |
| 9,594,620 B2 | 3/2017 | Xia et al. |
| 9,703,644 B1 | 7/2017 | Jagannatha et al. |
| 9,729,615 B2 | 8/2017 | Nair |
| 9,864,634 B2 | 1/2018 | Kenkre et al. |
| 9,898,224 B1 | 2/2018 | Marshak et al. |
| 9,999,030 B2 | 6/2018 | Gu et al. |
| 10,048,996 B1 | 8/2018 | Bell et al. |
| 10,057,184 B1 | 8/2018 | Prahlad et al. |
| 10,097,620 B2 | 10/2018 | Reddy et al. |
| 10,514,907 B2 | 12/2019 | Chaganti et al. |
| 10,944,561 B1 * | 3/2021 | Cahill ................... H04L 9/3213 |
| 2001/0044782 A1 | 11/2001 | Hughes et al. |
| 2003/0149919 A1 | 8/2003 | Greenwald et al. |
| 2004/0078683 A1 | 4/2004 | Buia et al. |
| 2004/0088145 A1 | 5/2004 | Rosenthal et al. |
| 2004/0177168 A1 | 9/2004 | Alabraba et al. |
| 2004/0177354 A1 | 9/2004 | Gunyakti et al. |
| 2004/0225381 A1 | 11/2004 | Ritz et al. |
| 2004/0250260 A1 | 12/2004 | Pioso |
| 2005/0033770 A1 | 2/2005 | Oglesby et al. |
| 2005/0078656 A1 | 4/2005 | Bryant et al. |
| 2005/0120112 A1 | 6/2005 | Wing et al. |
| 2005/0144151 A1 | 6/2005 | Fischman et al. |
| 2005/0144188 A1 | 6/2005 | Bailey et al. |
| 2006/0117212 A1 | 6/2006 | Meyer et al. |
| 2006/0149408 A1 | 7/2006 | Speeter et al. |
| 2006/0178864 A1 | 8/2006 | Khanijo et al. |
| 2006/0179116 A1 | 8/2006 | Speeter et al. |
| 2006/0235962 A1 | 10/2006 | Vinberg et al. |
| 2007/0143851 A1 | 6/2007 | Nicodemus et al. |
| 2007/0202469 A1 | 8/2007 | Davidson |
| 2007/0283011 A1 * | 12/2007 | Rakowski ............. H04L 67/125 |
| | | 709/225 |
| 2008/0037532 A1 | 2/2008 | Sykes et al. |
| 2008/0065700 A1 | 3/2008 | Lim |
| 2008/0201470 A1 | 8/2008 | Sayama |
| 2008/0228755 A1 | 9/2008 | Haga et al. |
| 2008/0262860 A1 | 10/2008 | Schneider et al. |
| 2009/0012805 A1 | 1/2009 | Schnell et al. |
| 2009/0113248 A1 | 4/2009 | Bock et al. |
| 2009/0165099 A1 | 6/2009 | Eldar et al. |
| 2009/0183010 A1 | 7/2009 | Schnell et al. |
| 2009/0260071 A1 | 10/2009 | Sadovsky et al. |
| 2009/0282283 A1 | 11/2009 | Sakakura et al. |
| 2009/0307333 A1 | 12/2009 | Welingkar |
| 2010/0024001 A1 | 1/2010 | Campbell et al. |
| 2010/0057677 A1 | 3/2010 | Rapp et al. |
| 2010/0180221 A1 | 7/2010 | Cloward et al. |
| 2010/0229022 A1 | 9/2010 | Anand et al. |
| 2010/0306489 A1 | 12/2010 | Abts et al. |
| 2010/0312522 A1 | 12/2010 | Laberge et al. |
| 2010/0318487 A1 | 12/2010 | Marvasti |
| 2010/0325493 A1 | 12/2010 | Morimura et al. |
| 2011/0078428 A1 | 3/2011 | Hamid |
| 2011/0093703 A1 | 4/2011 | Etchegoyen |
| 2011/0270482 A1 | 11/2011 | Holzer |
| 2011/0289342 A1 | 11/2011 | Schaefer et al. |
| 2011/0289343 A1 | 11/2011 | Schaefer et al. |
| 2011/0302305 A1 | 12/2011 | Morimura et al. |
| 2012/0016841 A1 | 1/2012 | Karonde et al. |
| 2012/0041976 A1 | 2/2012 | Annapragada |
| 2012/0083917 A1 | 4/2012 | Zhou et al. |
| 2012/0096272 A1 * | 4/2012 | Jasper ................. H04L 63/0853 |
| | | 713/176 |
| 2012/0110142 A1 | 5/2012 | Montagna et al. |
| 2012/0144244 A1 | 6/2012 | Dan et al. |
| 2012/0150926 A1 | 6/2012 | Adkins et al. |
| 2012/0166142 A1 | 6/2012 | Maeda et al. |
| 2012/0182151 A1 | 7/2012 | Tong et al. |
| 2012/0233216 A1 | 9/2012 | Lim |
| 2012/0265872 A1 | 10/2012 | Chilton |
| 2012/0271927 A1 | 10/2012 | Shakirzyanov et al. |
| 2012/0331526 A1 | 12/2012 | Caudle et al. |
| 2013/0151975 A1 | 6/2013 | Shadi et al. |
| 2013/0185667 A1 | 7/2013 | Harper et al. |
| 2013/0257627 A1 | 10/2013 | Rafael |
| 2013/0317870 A1 | 11/2013 | Franco et al. |
| 2013/0326029 A1 | 12/2013 | Flynn |
| 2014/0069291 A1 | 3/2014 | Yang et al. |
| 2014/0082417 A1 | 3/2014 | Barton et al. |
| 2014/0115176 A1 | 4/2014 | Kamboh et al. |
| 2014/0245085 A1 | 8/2014 | Halverson et al. |
| 2014/0281675 A1 | 9/2014 | Sreenivasan et al. |
| 2014/0304399 A1 | 10/2014 | Chaudhary et al. |
| 2014/0304402 A1 | 10/2014 | Prakash et al. |
| 2014/0324276 A1 | 10/2014 | Weaks |
| 2014/0337957 A1 * | 11/2014 | Feekes ................ H04L 63/0861 |
| | | 726/9 |
| 2014/0344101 A1 | 11/2014 | Collet et al. |
| 2015/0106606 A1 | 4/2015 | Cao et al. |
| 2015/0117174 A1 | 4/2015 | Alber et al. |
| 2015/0120359 A1 | 4/2015 | Dongieux |
| 2015/0149822 A1 | 5/2015 | Coronado et al. |
| 2015/0256394 A1 | 9/2015 | Palmer et al. |
| 2015/0264012 A1 | 9/2015 | Rieke et al. |
| 2015/0324255 A1 | 11/2015 | Kochunni |
| 2016/0042288 A1 | 2/2016 | Cohen et al. |
| 2016/0048611 A1 | 2/2016 | Cox et al. |
| 2016/0050222 A1 | 2/2016 | Iyer et al. |
| 2016/0057009 A1 | 2/2016 | Kadayam et al. |
| 2016/0110240 A1 | 4/2016 | Reger et al. |
| 2016/0112504 A1 | 4/2016 | Mathur et al. |
| 2016/0173690 A1 | 6/2016 | Perez et al. |
| 2016/0294643 A1 | 10/2016 | Kim |
| 2016/0302323 A1 | 10/2016 | Gosselin |
| 2017/0017881 A1 | 1/2017 | Langley et al. |
| 2017/0032091 A1 | 2/2017 | Rudorfer et al. |
| 2017/0085644 A1 | 3/2017 | Chouhan et al. |
| 2017/0094003 A1 | 3/2017 | Gahlot et al. |
| 2017/0206128 A1 | 7/2017 | Anderson et al. |
| 2017/0228649 A1 | 8/2017 | Chatterjee et al. |
| 2017/0242740 A1 | 8/2017 | Bell et al. |

(56) References Cited

U.S. PATENT DOCUMENTS

| | | | |
|---|---|---|---|
| 2017/0308420 | A1 | 10/2017 | Korotaev et al. |
| 2017/0339005 | A1 | 11/2017 | Yuan et al. |
| 2018/0025166 | A1 | 1/2018 | Daniel et al. |
| 2018/0034709 | A1 | 2/2018 | Chen et al. |
| 2018/0041388 | A1 | 2/2018 | Moens et al. |
| 2018/0285009 | A1 | 10/2018 | Guim Bernat et al. |
| 2018/0302277 | A1 | 10/2018 | Shimamura et al. |
| 2018/0321934 | A1 | 11/2018 | Chaganti et al. |
| 2018/0322019 | A1 | 11/2018 | Stowell et al. |
| 2018/0329579 | A1 | 11/2018 | Kaimal et al. |
| 2019/0123985 | A1 | 4/2019 | Rao et al. |
| 2019/0149408 | A1 | 5/2019 | Li |
| 2019/0182105 | A1 | 6/2019 | Stephens et al. |
| 2019/0303137 | A1 | 10/2019 | Chaganti et al. |
| 2019/0306013 | A1 | 10/2019 | Ali et al. |
| 2019/0324841 | A1 | 10/2019 | Patel et al. |
| 2020/0034069 | A1 | 1/2020 | Batra et al. |
| 2020/0079403 | A1 | 3/2020 | Setiawan et al. |

OTHER PUBLICATIONS

"Dell EMC OpenManage Essentials Version 2.3: User's Guide"; XP055602720; Oct. 1, 2017; https://topics-cdn.dell.com/pdf/openmanage-essentials-v23 users-guide en-US.pdf.

"Integrated Dell Remote Access Controller 8 (iDRAC8): Version 2.05.05.05 User's Guide"; Dell Inc.; 2014.

Doug Iler et al.; "Introducing iDRAC8 with Lifecycle Controller for Dell 13th Generation PowerEdge Servers"; Dell Inc., A Dell Deployment and Configuration Guide; Sep. 2014.

Duncan Tweed; "Baseline configuration"; BMC Software, Inc.; Apr. 7, 2015; retrieved from https://bmc.com/.

Duncan Tweed; "BMC Atrium Discovery User Guide"; BMC Software, Inc.; Mar. 2014; retrieved from https://bmc.com/.

Masoom Parvez; "AutomaticGroup Node"; BMC Software, Inc.; 2014; retrieved from https://bmc.com/.

George Coulouris et al, Dell EMC Data Protection Advisor: Distributed Systems Concepts and Design, Dell EMC Data Protection Advisor: Distributed Systems Concepts and Design, retrieved Nov. 29, 2020, pp. 1-25 (of 488) https://web.archive.org/web/20201129060023/https://www.delltechnologies.com/en-us/collaterals/unauth/technical-guides-support-information/products/networking-4/docu82478.pdf, Report Reference Guide 302-003-605 REV 1 (2017.

Coulouris et al.; "Distributed Systems: Concepts and Design, Fifth Edition"; Addison-Wesley; pp. 37-61; 2012.

Zhengyu Liang et al.; "ClusterProbe: An Open, Flexible and Scalable Cluster Monitoring Tool"; IEEE Computer Society International Workshop on Cluster Computing; pp. 261-268; 1999.

Anonymous, "Dell EMC OpenManage Essentials Version 2.3 User's Guide", https://topics-cdn.dell.com/pdf/openmanage-essentials-v23_users-guide_en-US.pdf; Oct. 1, 2017 (4 pages).

Office Action issued in corresponding Chinese Patent Application No. 201910242816.8 dated Jul. 22, 2021 (10 pages).

Office Action issued in corresponding Chinese Patent Application No. 201910243208.9 dated Aug. 3, 2021 (13 pages).

* cited by examiner

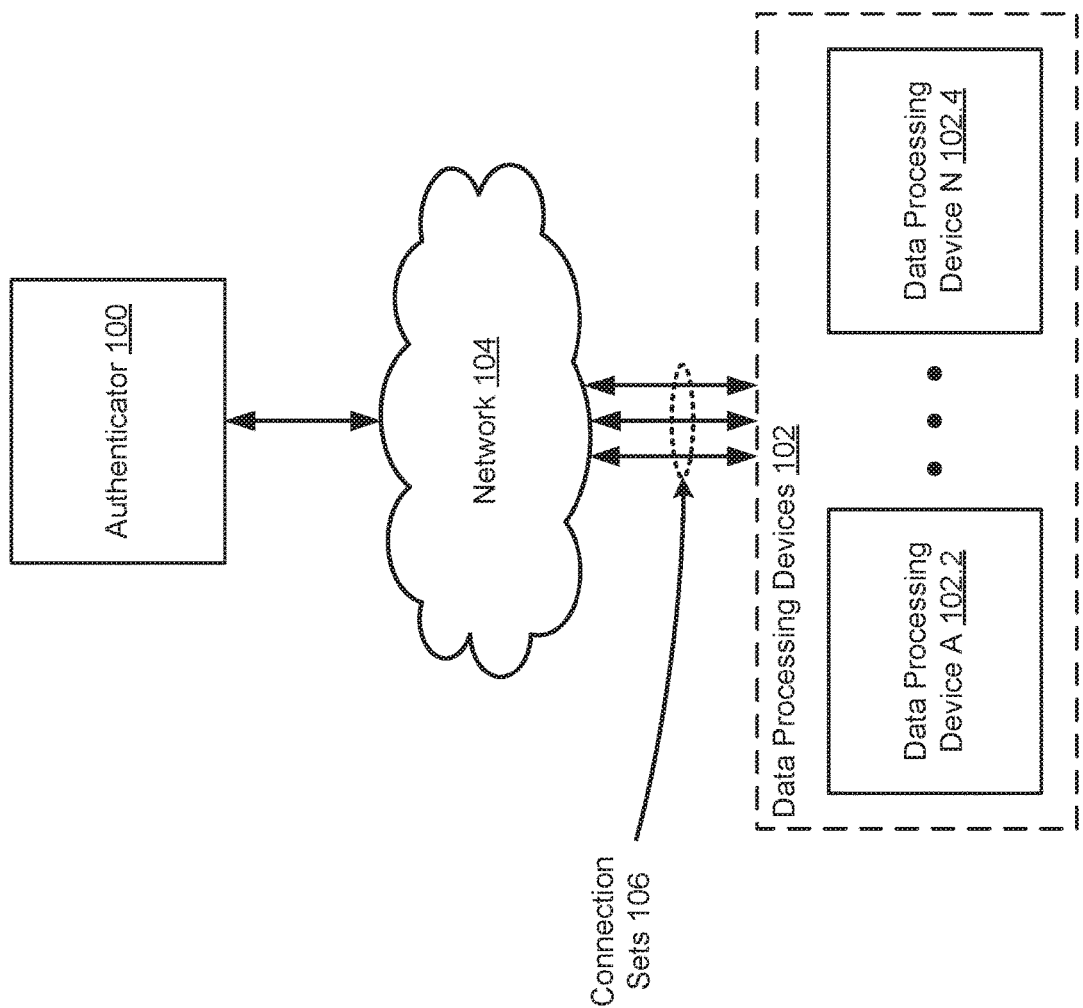

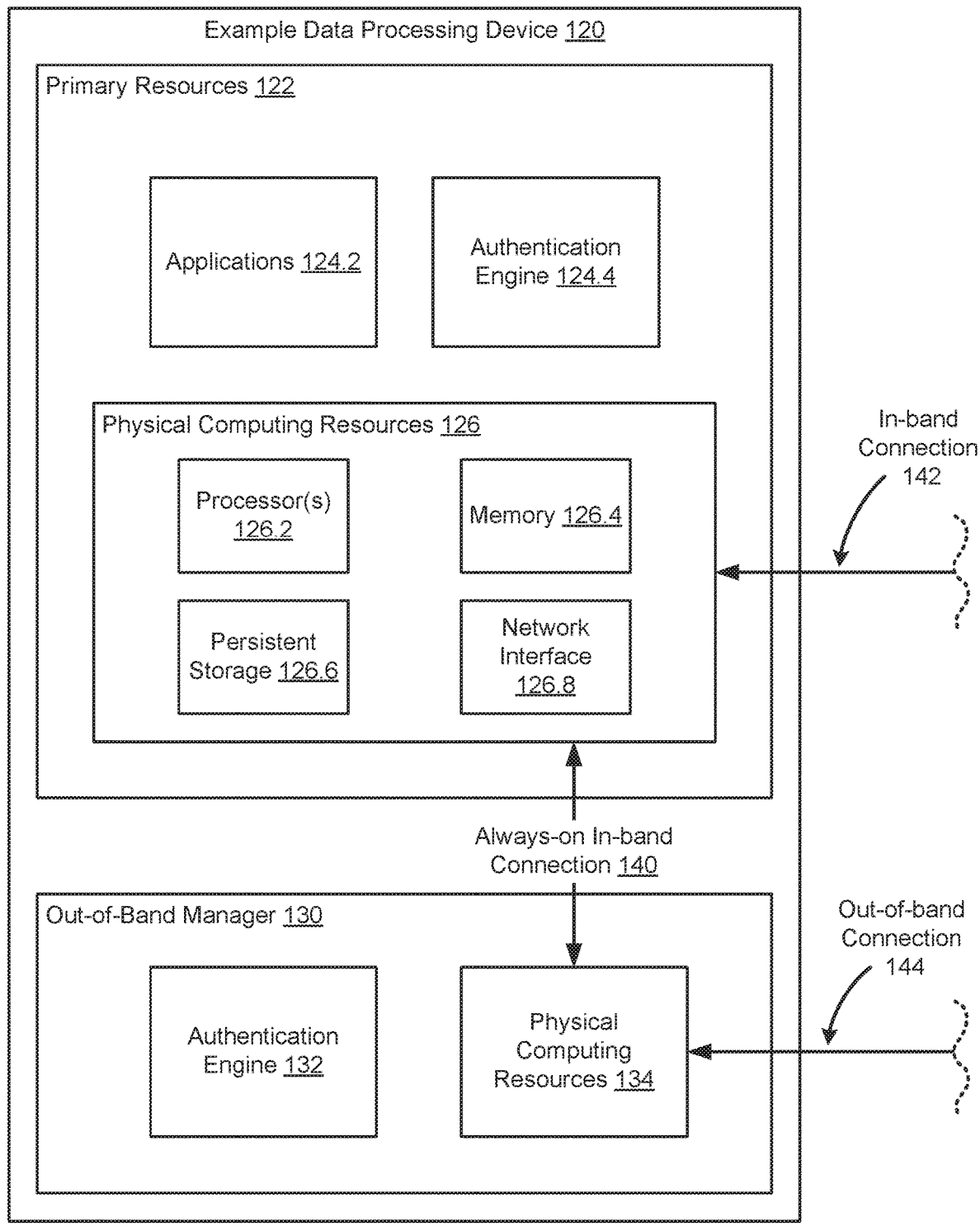
FIG. 1.2

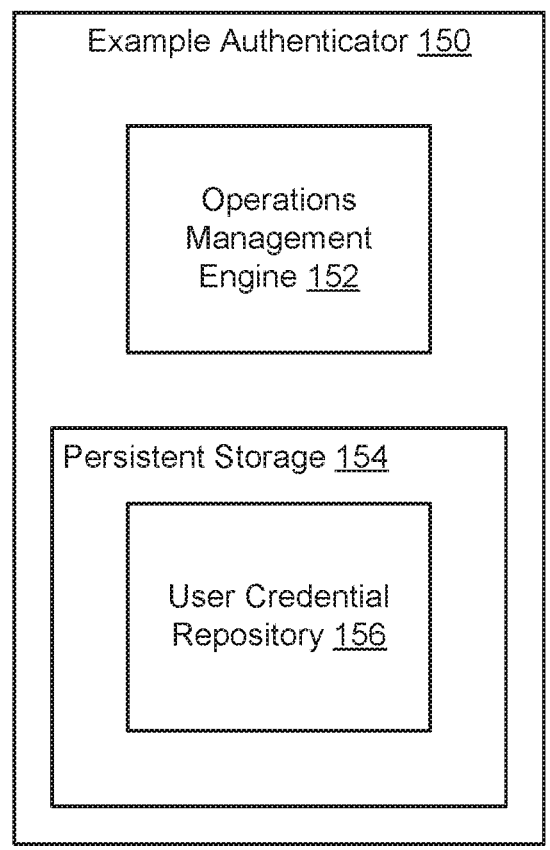
FIG. 1.3

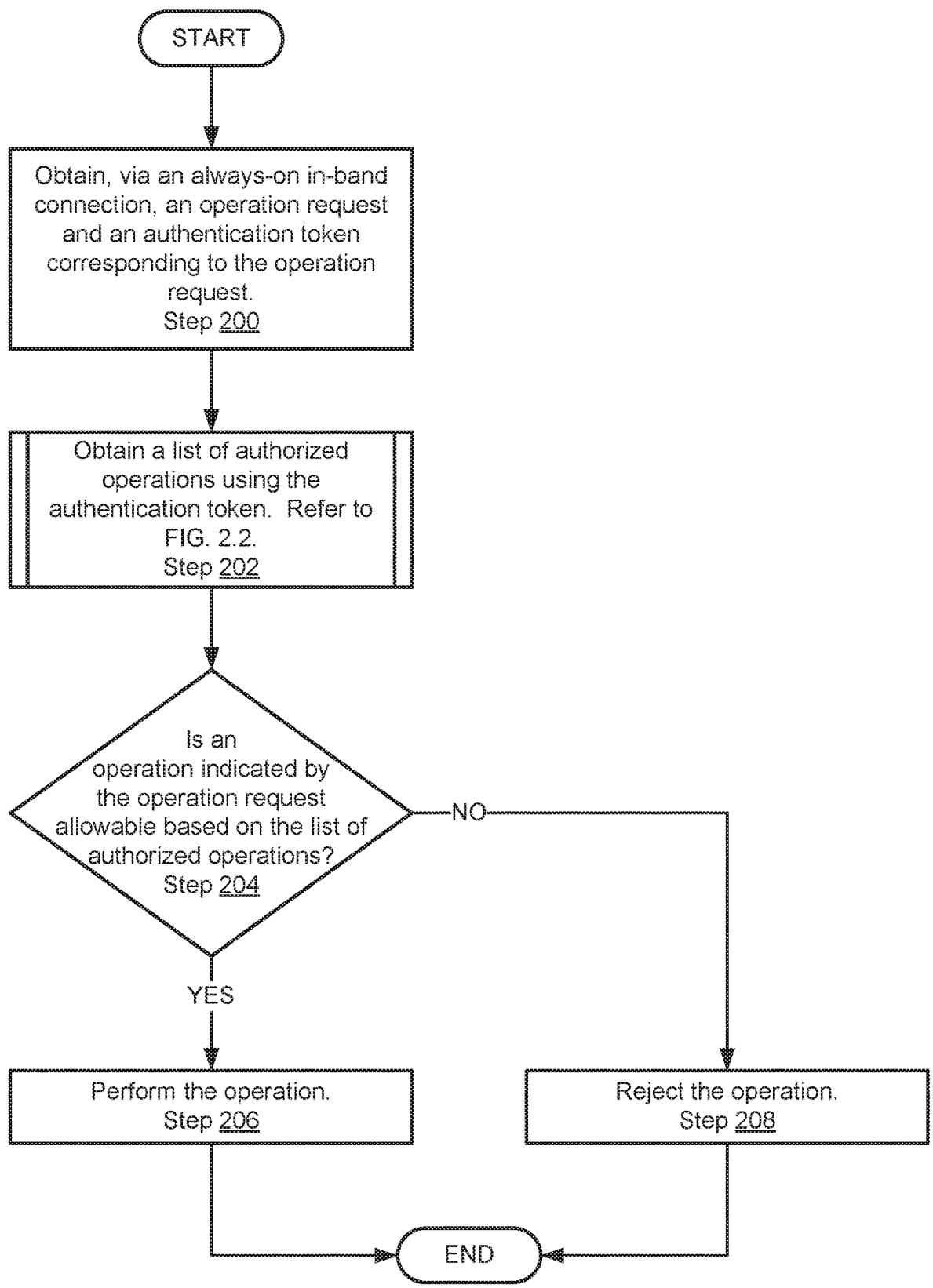
FIG. 2.1

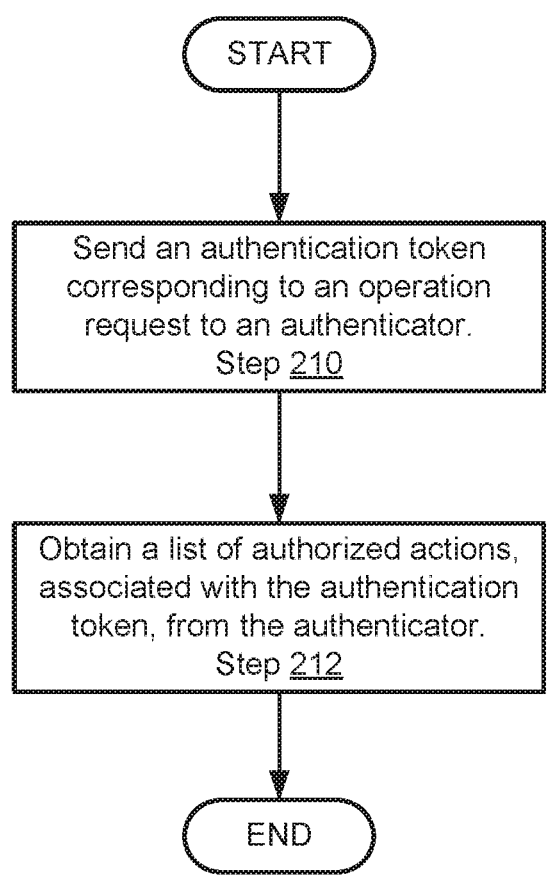
FIG. 2.2

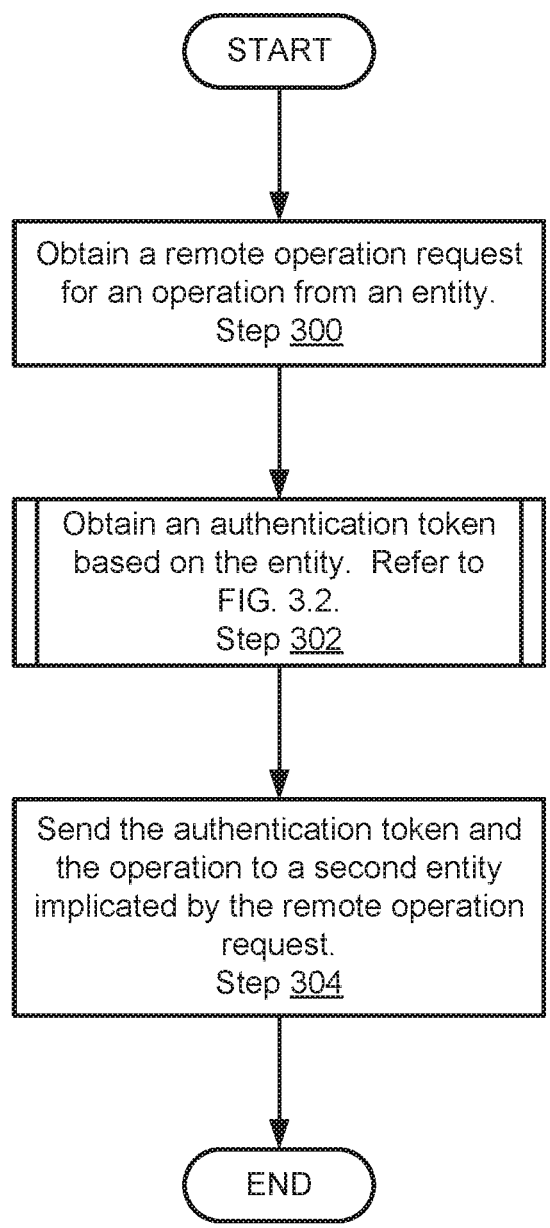
FIG. 3.1

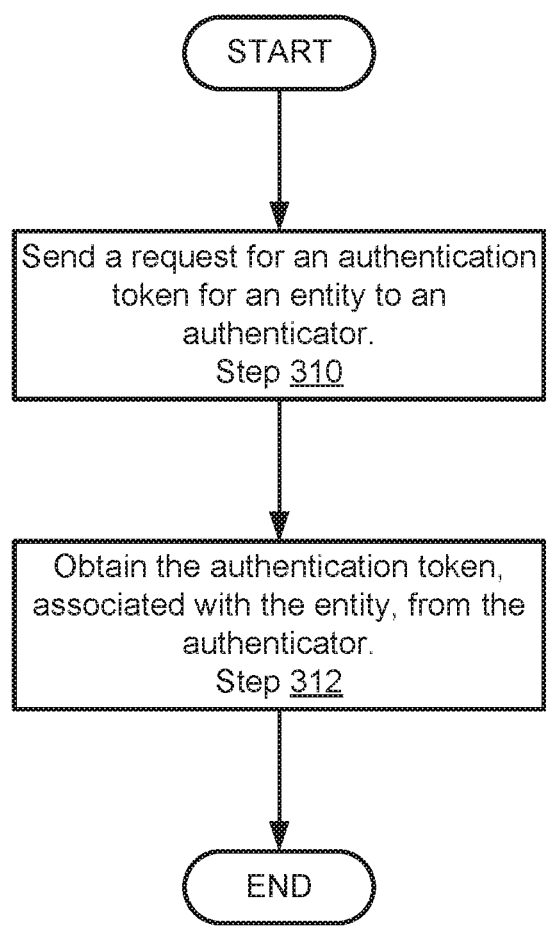
FIG. 3.2

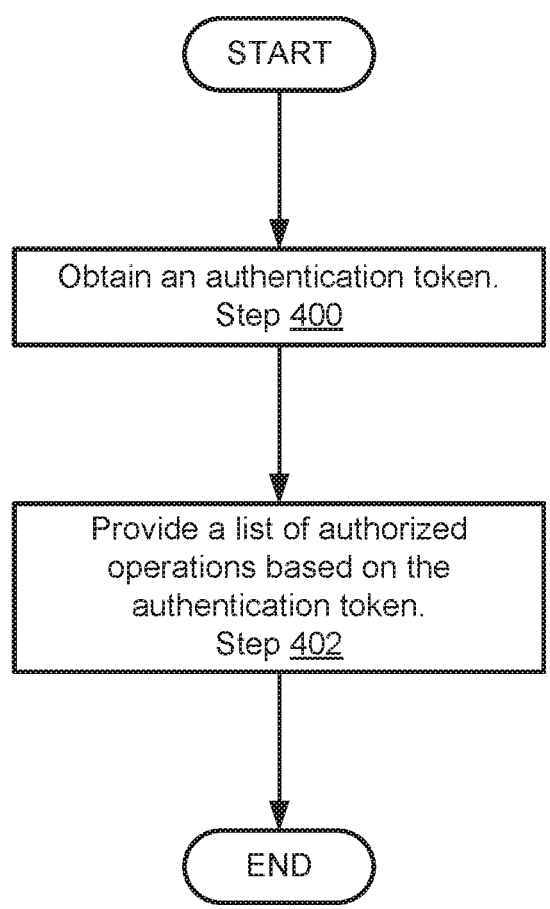
FIG. 4.1

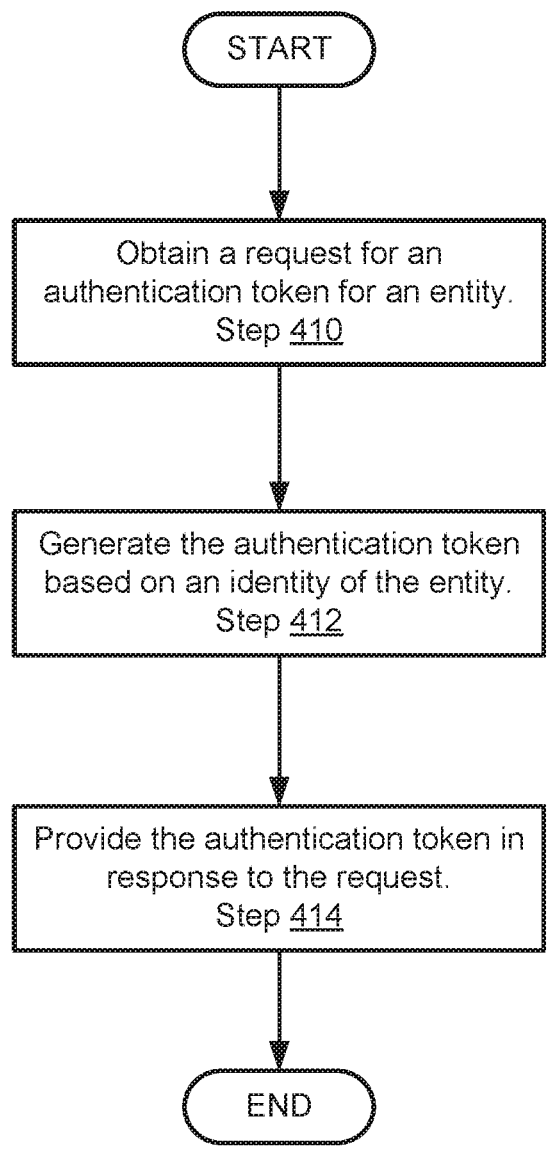
FIG. 4.2

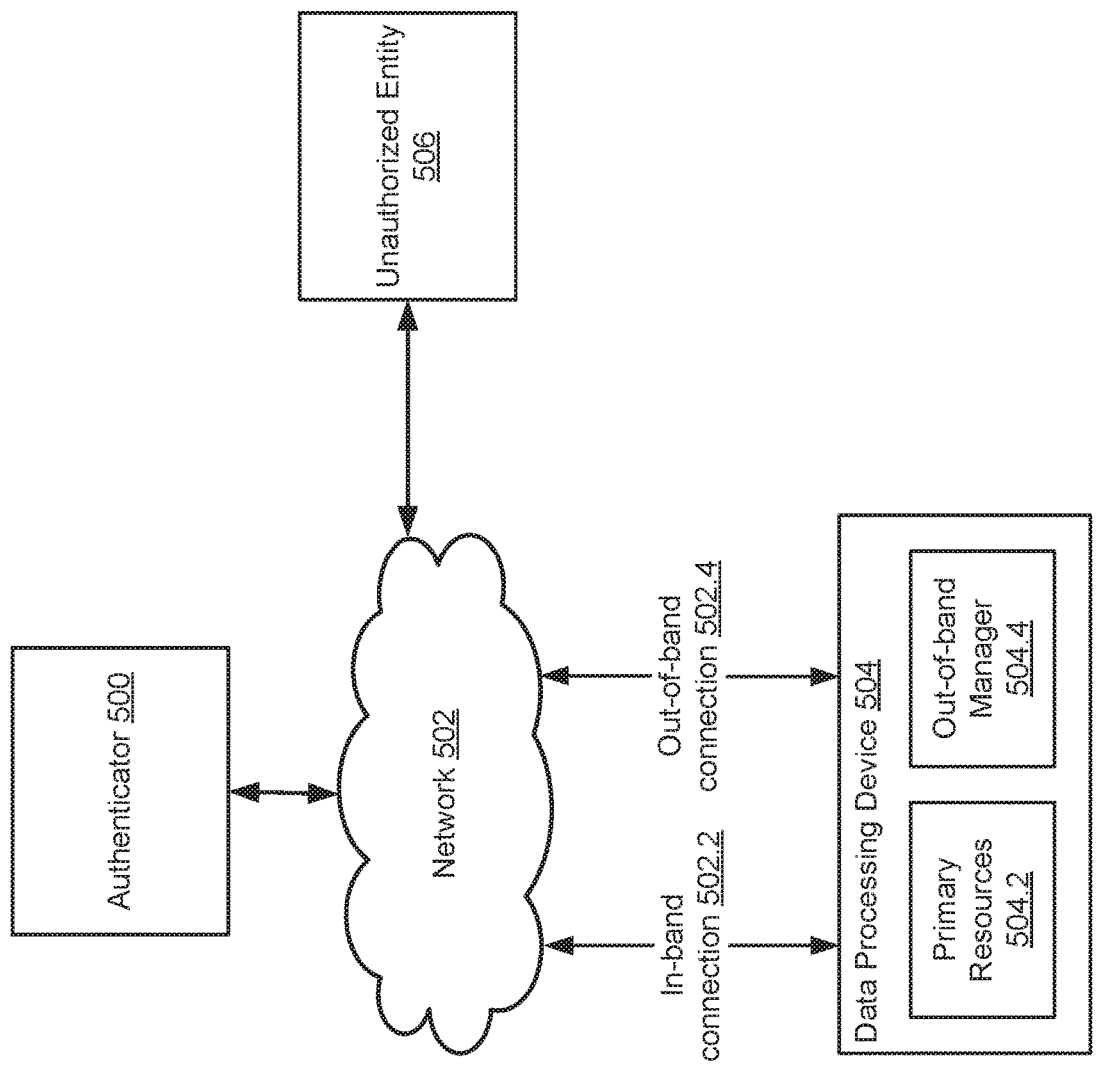
FIG. 5.1

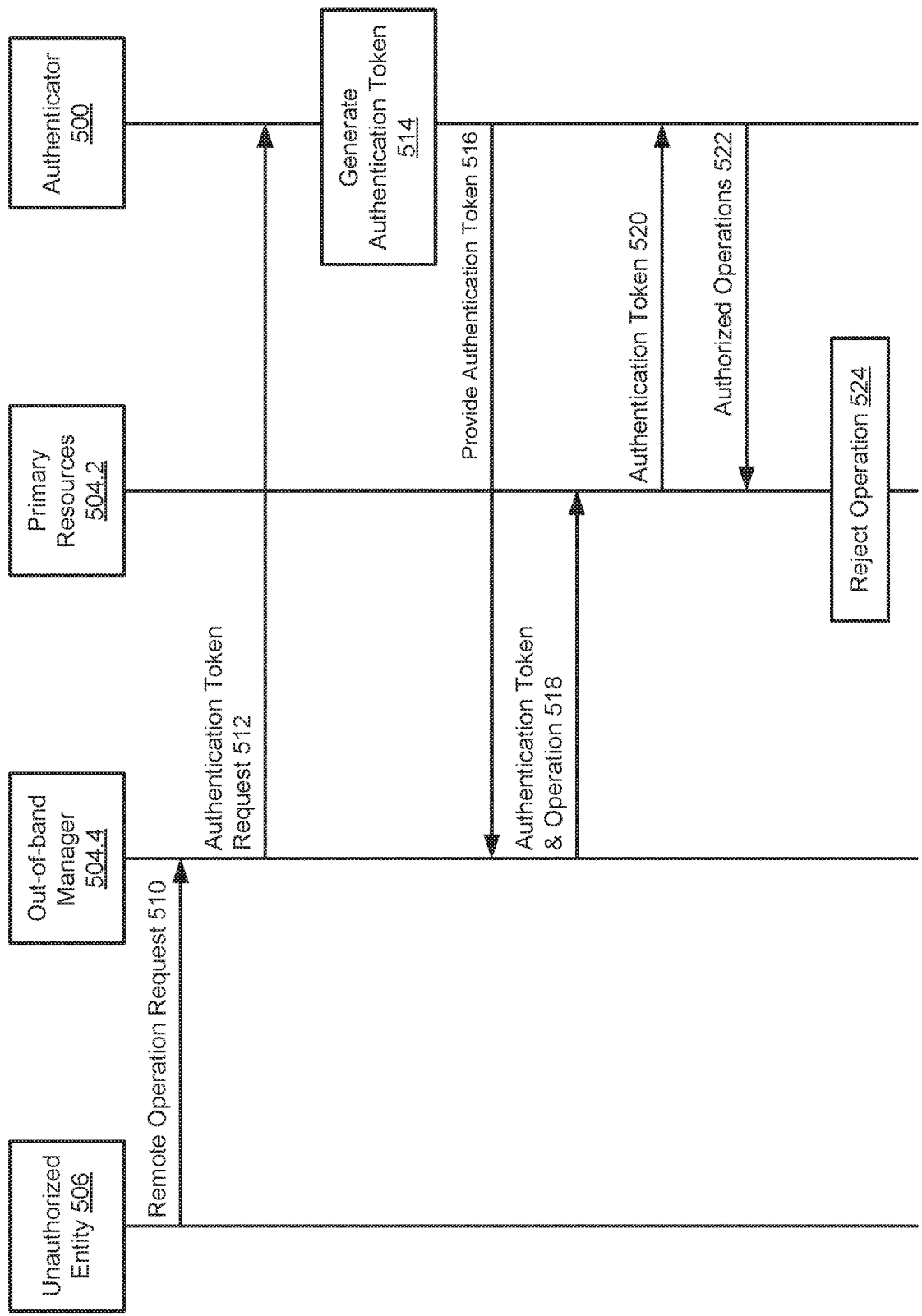
FIG. 5.2

SYSTEM AND METHOD FOR DATA PROCESSING DEVICE MANAGEMENT

BACKGROUND

Data processing devices may include multiple types of physical components. For example, data processing devices may include processors, memory, and persistent storage. To utilize the computing resources provided by these physical components, data processing devices may host any number of applications.

The operation of the data processing devices may be dictated by the combination of physical components included in the data processing devices and the applications hosted by the data processing devices. Depending on the types of physical components, the configuration of the components, and the operation of the applications, the behavior of the data processing devices may vary.

SUMMARY

In one aspect, a data processing device in accordance with one or more embodiments of the invention includes primary resources; an out-of-band manager operably connected to the primary resources via an always-on in-band connection; and an authentication engine. The authentication engine obtains, via the always-on in-band connection, an operation request and an authentication token corresponding to the operation request; in response to obtaining the authentication token: obtains a list of authorized operations using the authentication token; makes a determination that an operation indicated by the operation request is allowable based on the list of authorized operations; and performs the operation based on the determination.

In one aspect, a method for managing a data processing device in accordance with one or more embodiments of the invention includes obtaining, from an out-of-band manager and via an always-on in-band connection, an operation request and an authentication token corresponding to the operation request; in response to obtaining the authentication token: obtaining, by an authentication engine, a list of authorized operations using the authentication token; making a determination that an operation indicated by the operation request is allowable based on the list of authorized operations; and performing the operation based on the determination.

In one aspect, a non-transitory computer readable medium in accordance with one or more embodiments of the invention includes computer readable program code, which when executed by a computer processor enables the computer processor to perform a method for managing a data processing device. The method includes obtaining, from an out-of-band manager and via an always-on in-band connection, an operation request and an authentication token corresponding to the operation request; in response to obtaining the authentication token: obtaining, by an authentication engine, a list of authorized operations using the authentication token; making a determination that an operation indicated by the operation request is allowable based on the list of authorized operations; and performing the operation based on the determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a data processing device in accordance with one or more embodiments of the invention.

FIG. 1.3 shows a diagram of an authenticator in accordance with one or more embodiments of the invention.

FIG. 2.1 shows a flowchart of a method of responding to operation requests in accordance with one or more embodiments of the invention.

FIG. 2.2 shows a flowchart of a method of obtaining a list of authorized operations in accordance with one or more embodiments of the invention.

FIG. 3.1 shows a flowchart of a method of responding to remote operation requests in accordance with one or more embodiments of the invention.

FIG. 3.2 shows a flowchart of a method of obtaining authentication tokens in accordance with one or more embodiments of the invention.

FIG. 4.1 shows a flowchart of a method of responding to a request including an authentication token in accordance with one or more embodiments of the invention.

FIG. 4.2 shows a flowchart of a method of responding to a request for an authentication token in accordance with one or more embodiments of the invention.

FIGS. 5.1-5.2 show a non-limiting example of a system and actions performed by the system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing the state of a data processing device. Specifically, embodiments of the invention may provide methods for proactively determining whether to perform operations obtained via what are traditionally considered to be secure connections. Operations that are determined to be unauthorized may be rejected. By doing so, the state of the data processing device may be maintained by avoiding performance of such unauthorized operations.

FIG. 1.1 shows a system in accordance with one or more embodiments of the invention. The system may include any number of data processing devices (102) that provide functionality (e.g., computer implemented services). Each of the data processing devices (102) may provide similar or different functionality. In some embodiments of the invention, one or more of the data processing devices (102) may cooperate to provide functionality To provide their respective functionalities, each of the data processing devices (102) may be in a predetermined state corresponding to the functionality. The state of a data processing device may reflect the configuration (e.g., hardware configuration, driver versions, hosted application, etc.) of the data processing device.

Over time, the predetermined state for any of the data processing devices may change. For example, the predetermined state of a data processing device may change to match changes in the operation of an application hosted by the data processing device. The predetermined state of a data processing device may change due to other reasons without departing from the invention.

To facilitate updating of the state of the data processing devices to match a predetermined state, each of the data processing devices may enable remote entities to modify their respective configurations. For example, a management entity (not shown) may remotely modify one or more portions (e.g., application configurations, application versions, configuration settings, etc.) of a data processing device (e.g., 102.2, 102.4) to update its state to match a predetermined state.

To manage the state of any number of data processing devices (102), the system may include an authenticator (100). The authenticator (100) may provide authentication services to the data processing devices (102) with respect to entities attempting to modify the states of the respective data processing devices (102). By utilizing the authentication services provided by the authenticator (100), the data processing devices (102) may selectively allow other entities to modify their states to reduce the likelihood of unauthorized parties modifying their states.

The components illustrated in FIG. 1.1 may be operably connected by any combination of wired and/or wireless connections. For example, the authenticator (100) may be operably connected to the data processing devices (102) via a network (104). The network (104) may be any type of network without departing from the invention.

In one or more embodiments of the invention, the data processing devices (102) are connected to the authenticator via connection sets (106). A connection set may be multiple connections that enable different portions of a data processing device to independently communicate with the authenticator (100) and/or other entities (not shown). For example, two different portions of a data processing device may be operably connected to the network (104) via two different connections of a connection set. In this manner, each of the two different portions of the data processing device may independently (from the other portion) communicate with other entities.

To further clarify embodiments of the invention, each component of the system of FIG. 1.1 is discussed below.

In one or more embodiments of the invention, each of the data processing devices (102) provides functionality. The functionality may correspond to one or more computer implemented services which a respective data processing device provides independently or in cooperation with any number of other data processing devices. A computer implemented service may be, for example, an electronic mail management service, database service, file storage service, etc. A data processing device may provide any number of computer implemented services that gives rise to the functionality provided by the data processing device.

In one or more embodiments of the invention, each of the data processing devices (102) selectively allows remote modifications to its state. In one or more embodiments of the invention, the state of a data processing device refers to the in-use application configuration settings, hardware configuration settings, applications hosted by the data processing devices, and/or other characteristics of the data processing device that control the manner in which the data processing device operates. The data processing devices (102) may selectively allow remote modifications to its state by: (i) identifying a remote entity attempting to modify its state, (ii) determining what, if any, characteristics of the data processing device that the remote entity is authorized to modify, and (iii) allow or reject any of the attempted modifications by the remote entity. By doing so, each of the data processing devices (102) may self-manage their respective states by reducing the likelihood of unauthorized parties modifying their respective states.

The each of the data processing devices (102) may include computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions (in addition to other data), computer code, that (when executed by the processor(s) of the computing device) cause the computing device to perform the functions of the respective data processing devices (102) described in this application and/or all, or a portion, of the methods illustrated in FIGS. 2.1-4.2. The each of the data processing devices (102) may include other types of computing devices without departing from the invention.

In one or more embodiments of the invention, each of the data processing devices (102) is a distributed computing device. As used herein, a distributed computing device refers to functionality provided by multiple computing devices cooperatively providing one or more functionalities. For example, a distributed computing device may include multiple, separate computing devices that are each programmed to perform all, or a part, of the one or more functionalities. In such a scenario, the functionality of the respective data processing devices (102) may be performed by multiple, different computing devices without departing from the invention.

To provide the functionality of the respective data processing devices (102), any of the computing devices of the respective data processing devices (102) may include computer instructions, e.g., computer code, that when executed by one or more processors of the computing devices of the respective data processing devices (102) cause the computing devices of the respective data processing devices (102) to perform the functions described in this application and/or all, or a portion, of the methods illustrated in FIGS. 2.1-4.2.

In one or more embodiments of the invention, all, or a portion, of the computing devices of the respective data processing devices (102) include special purpose hardware devices. The special purpose hardware devices may be, for example, storage controllers, raid controllers, load balancers, and/or any other type of special purpose hardware devices for providing computer implemented services. The special purpose hardware devices of the respective data processing devices (102) may perform different and/or similar functions. The special purpose hardware devices of the respective data processing devices (102) may, when providing the functionality of the respective data processing devices (102), invoke the functionality of the special purpose hardware devices.

All or a portion of the respective data processing devices (102) may be implemented using one or more logical devices without departing from the invention. For example, any of the data processing devices (102) may include a virtual machine (or multiple virtual machines) that utilizes computing resources of any number of computing devices to provide the functionality of the respective data processing device. Any of the data processing devices (102) may include other types of logical devices without departing from the invention.

For additional details regarding the data processing devices (102), refer to FIG. 1.2.

In one or more embodiments of the invention, the authenticator (100) provides authentication services. The authentication services may be used by the data processing devices (102) to determine to what extent a remote entity is authorized to modify the state of the data processing devices (102). Different entities may be authorized to modify the state of each of the data processing devices (102) to varying extents. The authenticator (100) may maintain records regarding the extent of each entities authentication for state modification of all, or a portion, of the data processing devices (102).

To provide authentication services, the authenticator (100) may (i) obtain identity information regarding an entity, (ii) compare the identity information to the records maintained by the authenticator (100), (iii) determine the extent (if any) to which the remote entity is authorized to modify the state of a data processing device based on the comparison, (iv) generate a token based on the determination, (v) provide the token to a data processing device, and/or (vi) specify the extent to which the remote entity is authorized to modify the state of a data processing device in response to receiving the token. By doing so, as will be discussed in greater detail with respect to FIGS. 1.2-1.3, a data processing device that hosts an out-of-band manager may utilize the token to reduce the likelihood of unauthorized parties from modifying its state.

The authenticator (100) may include computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions (in addition to other data), e.g., computer code, that (when executed by the processor(s) of the computing device) cause the computing device to perform the functions of the authenticator (100) described in this application and/or all, or a portion, of the methods illustrated in FIGS. 2.1-4.2. The authenticator (100) may include other types of computing devices without departing from the invention.

In one or more embodiments of the invention, the authenticator (100) is a distributed computing device. As used herein, a distributed computing device refers to functionality provided by multiple computing device cooperatively providing one or more functionalities. For example, a distributed computing device may include multiple, separate computing devices that are each programmed to perform all, or a part, of the one or more functionalities. In such a scenario, the functionality of the authenticator (100) may be performed by multiple, different computing devices without departing from the invention.

To provide the functionality of the authenticator (100), any of the computing devices of the authenticator (100) may include computer instructions, e.g., computer code, that when executed by one or more processors of the computing devices of the authenticator (100) cause the computing devices of the authenticator (100) to perform the functions described in this application and/or all, or a portion, of the methods illustrated in FIGS. 2.1-4.2.

In one or more embodiments of the invention, all, or a portion, of the computing devices of the authenticator (100) include special purpose hardware devices. The special purpose hardware devices may be, for example, storage controllers, raid controllers, load balancers, and/or any other type of special purpose hardware devices for providing computer implemented services. The special purpose hardware devices of the authenticator (100) may perform different and/or similar functions. The special purpose hardware devices of the authenticator (100) may, when providing the functionality of the authenticator (100), invoke the functionality of the special purpose hardware devices.

All or a portion of the authenticator (100) may be implemented using one or more logical devices without departing from the invention. For example, the authenticator (100) may include a virtual machine (or multiple virtual machines) that utilizes computing resources of any number of computing devices to provide the functionality of the respective data processing device. The authenticator (100) may include other types of logical devices without departing from the invention.

For additional details regarding the data processing devices (102), refer to FIG. 1.3.

While the system of FIG. 1.1 is illustrated as including a limited number of specific components, a system in accordance with embodiments of the invention may include additional, fewer, and/or different components without departing from the invention.

To further clarify aspects of embodiments of the invention, diagrams of an example data processing device and example authenticator in accordance with embodiments of the invention in FIGS. 1.2 and 1.3, respectively. As noted above, the aforementioned components may interact when the system of FIG. 1.1 manages the respective states of any number of data processing devices.

FIG. 1.2 shows a diagram of an example data processing device (120) in accordance with one or more embodiments of the invention. The example data processing device (120) may be similar to any of the data processing devices (102) illustrated in FIG. 1.1.

As discussed above, the example data processing device (120) may (i) provide functionality and (ii) self-manage its state to efficiently provide its functionality.

To provide functionality, the example data processing device (120) may provide any number of computer implemented services. Each of the computer implemented services may provide similar and/or different functionality.

To provide the computer implemented services, the example data processing device (120) may host any number of applications (124.2). The applications (124.2) may include any number and/or type of applications that are hosted by the primary resources (122). In other word, the applications (124.2) may execute using the physical computing resources (126) of the primary resources (122). The physical computing resources (126) may include processor(s) (126.2), memory (126.4), persistent storage (126.6), and/or a network interface (126.8).

For example, the applications (124.2) may be implemented as computer code, i.e., computer instructions, that when executed by one or more processors (e.g., 126.2) of the primary resources (122) give rise to the functionality of the applications (124.2). The computer code corresponding to each of the applications (124.2) may be stored on the persistent storage (126.6) of the physical computing resources (126) or in other locations (e.g., locally on other persistent storage or remotely on other devices).

The applications (124.2) may provide any quantity and type of computer implemented services. A computer implemented service may be, for example, electronic communications services, data management services, database services, etc. Any number and type (local and/or remote) of entities may utilize the computer implemented services provided by the applications (124.2).

For example, an application hosted by the primary resources (122) may provide electronic mail services to an entity that is remote to the example data processing device (120). In another example, an application hosted by the primary resources (122) may provide database services to other applications hosted by the primary resources (122) and additional applications hosted by other data processing devices operably connected to the example data processing device (120).

To self-manage its state to efficiently provide its functionality, the example data processing device (120) may enable remote entities to change its configuration. Such remote entities may send requests to the example data processing device (120) to change its configuration via an in-hand connection (142) and/or an out-of-band connection (144). The in-band connection (142) may operably connect the primary resources (122) to other entities while the out-of-band connection (144) may operably connect the out-of-band manager (130) to other entities. The in-band connection (142) and the out-of-band connection may be a connection set that operably connects the example data processing device (120) to other entities.

The primary resources (122) and the out-of-band manager (130) may be operably connected to each other via an always-on in-band connection (140). The always-on in-band connection may enable the primary resources (122) and the out-of-band manager (130) to communicate with each other without using the in-band connection (142) or the out-of-band connection.

Both of the primary resources (122) and the out-of-band manager (130) may include functionality to modify the configuration of the example data processing device (120). For example, the both of the aforementioned entities may be capable of modifying hardware settings (e.g., settings associated with the physical computing resources (126) that control the operations of the various components), firmware settings, software settings (e.g., settings of the applications (124.2) and/or other software entities), instantiating and/or terminating applications, etc. By modifying the configuration of the example data processing device (120), the state of the example data processing device (120) may be modified. The state of the example data processing device (120) may impact the operation of any of the applications (124.2) hosted by the primary resources (122).

For example, consider a scenario in which the operational characteristics of the memory (126.4) are modified which results in a decrease in the bandwidth available for accessing the memory (126.4). In such a scenario, the modification may reduce the rate upon which an application of the applications (124.2) due to the decreased available bandwidth.

A request to modify the configuration of the example data processing device (120) may be received via the in-band connection (142) or the out-of-band connection. Such requests may implicate action by either the primary resources (122) or the out-of-band manager (130). Consequently, a request obtained by, for example, the out-of-band manager (130) may need to be performed by the primary resources (122) and a request obtained by the primary resources (122) may need to be performed by the out-of-band manager (130). In such a scenario, the entity receiving the request may send an operation request, correspond to the request, to the other entity for execution.

To self-manage its state to efficiently provide its functionality, the example data processing device (120) may manage operation requests transmitted via the always-on in-band connection (140). To do so, the primary resources (122) and the out-of-band manager may include respective authentication engines (124.2, 132). The authentication engines may (i) send operation requests and/or additional information via the always-on in-band connection (140) to service requests from remote entities and (ii) determine whether to perform operation requests received via the always-on in-band connection (140). To determine whether to perform operation requests received via the always-on in-band connection (140), the authentication engines (124.2, 132) may utilize services provided by an authenticator. By doing so, the example data processing device (120) may decrease the likelihood of an unauthorized change to its state.

In one or more embodiments of the invention, one or more of the authentication engines (124.2, 132) is implemented as a hardware device including circuitry. The hardware device may be, for example, a digital signal processor, a field programmable gate array, or an application specific integrated circuit. The authentication engines (124.2, 132) may be other types of hardware devices without departing from the invention.

In one or more embodiments of the invention, one or more of the authentication engines (124.2, 132) is implemented as computing code stored on a persistent storage that when executed by a processor performs the functionality of the authentication engines (124.2, 132). The processor may be a hardware processor including circuitry such as, for example, a central processing unit or a microcontroller. The processor may be other types of hardware devices for processing digital information without departing from the invention.

For example, the authentication engine (124.4) hosted by the primary resources (122) may utilize the physical computing resources (126) for its execution. The persistent storage (126.6) may store computer code corresponding to the authentication engine (124.4) that when executed by the processor(s) (126.2) cause the example data processing device (120) to perform the functionality of the authentication engine (124.4).

Similarly, the authentication engine (132) hosted by the out-of-band manager (130) may utilize physical computing resources (134) of the out-of-band manager for its execution. The physical computing resources (134) may include persistent storage (not shown) that may store computer code corresponding to the authentication engine (132) that when executed by processor(s) (not shown) of the physical computing resources (134) cause the out-of-band manager (130) to perform the functionality of the authentication engine (132).

To provide the above noted functionality of the authentication engines (124.4, 132), one or more of the authentication engines (124.4, 132) may perform all, or a portion, of the methods illustrated in FIGS. 2.1-4.2.

The out-of-band manager (130) may be implemented as a hardware device. For example, the out-of-band manager (130) may be implemented as a circuit card hosted by the example data processing device (120). The out-of-band manager (130) may operate as a computing device separate from the example data processing device (120).

The out-of-band manager (130) may be implemented as a logical entity. For example, the out-of-band manager (130) may be a virtual machine hosted by the example data processing device (120) that utilizes virtual resources for its execution. In such a scenario, the out-of-band connection (144) and the always-on in-band connection (140) may be implemented as virtual connections supported by logical network interfaces maintained by the example data processing device (120). The primary resources (122) and the out-of-band manager (130) may each be allocated separate end points on a virtual network supported by the example data processing device (120).

While illustrated in FIG. 1.2 as being a portion of the example data processing device (120), the out-of-band manager (130) may be implemented as a separate physical device without departing from the invention. For example, the primary resources (122) of the example data processing device (120) may be implemented using a first rack mount server operably connected to a second rack mount server that is used to implement the out-of-band manager (130). The operable connection between the primary resources (122) and the out-of-band manager (130) may serve as an always-on in-band connection (140) while other interconnects serve as the in-band connection (142) and the out-of-band connection.

While the example data processing device (120) of FIG. 1.2 is illustrated as including a limited number of specific component, a data processing device in accordance with embodiments of the invention may include additional, fewer, and/or different components without departing from the invention.

As discussed above, the example data processing device (120) may utilize services provided by an authenticator when determining whether to perform operation requests obtained via the always-on in-band connection (140). FIG. 1.3 shows a diagram of an example authenticator (150) in accordance with one or more embodiments of the invention. The example authenticator (150) may be similar to the authenticator illustrated in FIG. 1.1.

The example authenticator (150) may provide services that enable authentication engines hosted by data processing devices to determine whether to perform operation requests. Specifically, the example authenticator (150) may (i) generate authentication tokens based on identities of entities and (ii) provide lists of authorized actions based on authentication tokens.

For example, consider a scenario in which an authentication engine of an out-of-band manager receives a request to modify a configuration of a data processing device and the request implicates action by primary resources to complete the modification of the configuration. In such a scenario, the authentication engine may send a request for an authentication token to the example authenticator (150). In response, the example authenticator (150) may generate an authentication token based on the identity of the requesting entity (i.e., the identity of the entity that sent the request to the out-of-band manager) and provide the authentication token to the out-of-band manager.

The out-of-band manager may send an operation request to the primary resources and the authentication token. In response to receiving the operation request, an authentication engine of the primary resources may send the authentication token to the example authenticator (150). Based on the authentication token, the example authenticator (150) may identify one or more operations that are authorized (i.e., operations for which the requesting entity is authorized to have performed by the example data processing device) and notify the primary resources of the authorized operations. The authentication engine may use the authorized operations to determine whether to allow or reject the operation request.

To provide the above noted functionality, the example authenticator (150) may include an operations management engine (152) and persistent storage (154) that stores a user credential repository (156).

The operations management engine (152) may include functionality to (i) generate authentication tokens and (ii) identify authorized operation based on authentication tokens. For example, the operations management engine (152) may utilize a hash function to generate authentication tokens. The operations management engine (152) may generate authentication tokens using other methods without departing from the invention.

An authentication token may be a data structure associated with a particular entity. The authentication tokens may be generated based on the identities of corresponding entities for when the authentication tokens are generated, and the authentication tokens may be used to determine an identity of an entity corresponding to the respective authentication tokens by the entity that generated the authentication tokens.

In one or more embodiments of the invention, the operations management engine (152) is implemented as a hardware device including circuitry. The hardware device may be, for example, a digital signal processor, a field programmable gate array, or an application specific integrated circuit. The operations management engine (152) may be other types of hardware devices without departing from the invention.

In one or more embodiments of the invention, the operations management engine (152) is implemented as computing code stored on a persistent storage that when executed by a processor performs the functionality of the operations management engine (152). The processor may be a hardware processor including circuitry such as, for example, a central processing unit or a microcontroller. The processor may be other types of hardware devices for processing digital information without departing from the invention.

To provide the above noted functionality of the operations management engine (152), the operations management engine (152) may perform all, or a portion, of the methods illustrated in FIGS. 2.1-4.2.

In one or more embodiments of the invention, the persistent storage (154) provides data storage resources for the operations management engine (152). The data storage resources may enable the example authenticator (150) to persistently store digital data. The persistent storage (154) may store data structures including a user credential repository (156). The persistent storage (154) may be a physical storage device or a logical storage device.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

The user credential repository (156) may be a data structure that stores information regarding operations that are authorized to be initiated by different users. For example, the user credential repository (156) may be a list of users and the operations which each of the users is authorized to initiate. Such information may be used to ascertain the types of operations for which any user is authorized to initiate. The operations may be operations that may be performed by data processing devices that modify the configuration and, consequently, the states of the data processing devices. While described as a list, the user credential repository (156) may have different structures without departing from the invention.

While the persistent storage (154) has been illustrated as including specific data in a specific format, a persistent storage (154) in accordance with embodiments of the invention may include additional, different, and/or less data without departing from the invention. Additionally, while the user credential repository (156) is illustrated as being a discrete data structure, the user credential repository (156) may include additional, different, and/or less information without departing from the invention. Further, the user credential repository (156) may be combined with other data structure and/or may be subdivided into any number of data structures without departing from the invention. The user credential repository (156) may be stored in other locations and/or spanned across any number of devices without departing from the invention.

While the example authenticator (150) of FIG. 1.3 is illustrated as including a limited number of specific component, an authenticator in accordance with embodiments of the invention may include additional, fewer, and/or different components without departing from the invention.

Returning to FIG. 1.1, the data processing devices (102) may allow remote entities to update their configurations and corresponding states. FIGS. 2.1-3.2 illustrates method that may be performed by the data processing devices (102) of the system of FIG. 1.1 when interacting with a remote entity requesting a modification of its configuration and corresponding state.

FIG. 2.1 shows a flowchart of a method in accordance with one or more embodiments of the invention. The method depicted in FIG. 2.1 may be used to respond to a request to perform an operation in accordance with one or more embodiments of the invention. The method shown in FIG. 2.1 may be performed by, for example, primary resources (e.g., 122, FIG. 1.2) of a data processing device and/or an out-of-band manager (130) of a data processing device. Other components of the system illustrated in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

In step 200, an operation request and an authentication token corresponding to the operation request is obtained via an always-on in-band connection. For example, primary resources or an out-of-band manager may receive a remote operation request from an entity. In response to receiving the remote operation request, the receiving entity (i.e., the primary resources or the out-of-band manager) may forward the request in the form of an operation request to another entity hosted by the data processing device hosting the receiving entity. Thus, if primary resources receive a request that implicates a corresponding out-of-band manager, the primary resources may send a request to the out-of-band manager via the always-on in-band connection.

The operation request may be a request for modifying the configuration of the entity that received the operation request. For example, if the operation request is received by primary resources, the primary resources may interpret the operation request as a request for modifying its configuration such as, for example, making changes to hardware settings, firmware settings, instantiation of new entities, termination of existing entities, and/or other modifications of its configuration.

The authentication token may be a data structure generated by an authenticator. For additional details regarding authenticators, refer to FIG. 1.3. The authentication token may include information regarding the entity that prompted the sending of the operation request and the authentication token of step 200. For example, the authentication token may include information that enables the authenticator to identify an entity associated with the authentication token. For additional details regarding the generation of authentication tokens and/or use of authentication tokens, refer to FIGS. 4.1-4.2.

As discussed above, the always-on in-band connection may provide productivity between primary resources and an out-of-band manager of the data processing device. For example, the always-on in-band connection may be a high-speed interconnect, a direct connection, or another type of operable connection that facilitates communications between the aforementioned entities.

In step 202, a list of authorized operations is obtained using the authentication token.

In one or more embodiments of the invention, the list of authorized operations is obtained based on an identity of an entity that sent an initial request, i.e., a remote request, to modify the configuration of the primary resources of the data processing device. For example, the identity may be used to determine the list of authorized operations. The identity may be used to query a database that includes a listing of authorized operations for each potential entity that can send a remote request to modify the configuration of the primary resources of the data processing device.

In one or more embodiments of the invention, the list of authorized operations is obtained via the method illustrated in FIG. 2.2. The list of authorized operations may be obtained via other methods without departing from the invention.

In step 204, it is determined whether an operation indicated by the operation request is allowable based on the list of authorized operations. The determination may be made by attempting to match one or more of the operations of the operation request to entries of the list of authorized operations. If it is determined that the operation indicated by the operation request is not allowable, the method may proceed to step 208. If it is determined that the operation indicated by the operation request is allowable, the method may proceed to step 206.

In step 206, the operation is performed. For example, the primary resources or the out-of-band manager that received the operation request or the operation. Performing the operation may modify configuration of the primary resources of the data processing device.

The method may end following step 206.

Returning to step 204, the method may proceed to step 208 if it is determined that an operation indicated by the operation request is not allowable.

In step 208, the operation is rejected. The operation may be rejected by not performing the operation. When operation is rejected, an entity that requested performance of the operation may be notified of the rejection. Other entities may also be notified of the rejection.

For example, management entities or security entities may be notified. Rejection of an operation to indicate an attempted illicit modification of the configuration and corresponding state of the data processing device. Such information may be used by the management entities and/or the security entities to police the data processing device and/or other data processing devices to prevent future attempts at illicit modification of the configuration and corresponding state of the data processing devices.

The method may end following step 208.

As discussed above, a list of authorized operations may be obtained when the method of FIG. 2.1 is performed. FIG. 2.2 shows a flowchart of a method in accordance with one or more embodiments of the invention. The method depicted in FIG. 2.2 may be used to obtain a list of authorized operations in accordance with one or more embodiments of the invention. The method shown in FIG. 2.2 may be performed by, for example, primary resources (e.g., 122, FIG. 1.2) of a data processing device and/or an out-of-band manager (130) of a data processing device. Other components of the system illustrated in FIG. 1.1 may perform all, or a portion, of the method of FIG. 2.2 without departing from the invention.

While FIG. 2.2. is illustrated as a series of steps, any of the steps may be omitted, performed in a different order, additional steps may be included, and/or any or all of the steps may be performed in a parallel and/or partially overlapping manner without departing from the invention.

In step 210, an authentication token corresponding to an operation request is sent to an authenticator.

In one or more embodiments of the invention, the authentication token is sent via the network. For example, authentication token may be sent as portion of a request for the list of authorized operations.

In step 212, a list of authorized actions, associated with the authentication token, are obtained from the authenticator. List may be provided by the authenticator in response to receiving the authentication token.

In one or more embodiments of the invention, list of authorized actions specifies all of the operations that may be performed based on the authentication token. The authentication token may have been generated by the authenticator previously.

The method may end following step 212.

Thus, via the method illustrated in FIG. 2.1 primary resources and/or out-of-band managers may respond to requests obtained via an always-on in-band connection. However, in some cases other types of requests, i.e., remote requests may be obtained via other connections as an in-band connection that operably connects primary resources to other entities or an out-of-band connection that operably connects out-of-band managers to other entities (i.e., entities that may send remote requests). In response to such remote requests, the methods illustrated in FIGS. 3.1-3.2 may be performed.

FIG. 3.1 shows a flowchart of a method in accordance with one or more embodiments of the invention. The method depicted in FIG. 3.1 may be used to respond to a remote operation request in accordance with one or more embodiments of the invention. The method shown in FIG. 3.1 may be performed by, for example, primary resources (e.g., 122, FIG. 1.2) of a data processing device and/or an out-of-band manager (130) of a data processing device. Other components of the system illustrated in FIG. 1.1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, a remote operation request for an operation is obtained from an entity.

In one or more embodiments of the invention, the entity is remote to the data processing device. In other words, the remote operation request may be obtained via an in-band connection or an out-of-band connection depending on the component (e.g., primary resources or out-of-band manager) that obtained the remote operation request.

In one or more embodiments of the invention, the operation may specify a modification to the configuration of primary resources of the data processing device.

In step 302, an authentication token is obtained based on the entity.

In one or more embodiments of the invention, the authentication token is based on the identity of the entity. For example, the authentication token may be a hash of an identity of the entity. The authentication token may be other types of anonymizing but still identifying data structures. For example, authentication token may only include information that is meaningful to the entity that generated authentication token or has a key that enables an identity upon which the authentication token was generated to be recognized using the authentication token.

In one or more embodiments of the invention, authentication token is obtained via the method illustrated in FIG. 3.2. Authentication token may be obtained via other methods without departing from the invention.

In step 304, the authentication token and the operation are sent to a second entity implicated by the remote operation request. As discussed above, depending on the entity that received the remote operation request of step 300, a different entity may be implicated by the remote operation request if the different entity is to perform the operation indicated by the remote operation request.

For example, if primary resources obtain the remote operation request, the authentication token and the operation may be sent to an out-of-band manager if action by the out-of-band manager is implicated by the operation indicated by the remote operation request.

In another example, if an out-of-band manager obtains the remote operation request, the authentication token and the operation may be sent to primary resources if action by the primary resources is implicated by the operation indicated by the remote operation request.

In one or more embodiments of the invention, the authentication token in the operation are sent via an always-on in-band connection.

In one or more embodiments of the invention, sending the operation may include sending a request for the operation to be performed. In other words, an operation request may be sent via the always-on in-band connection.

The method may end following step 304.

As discussed above, an authentication token may be obtained when the method of FIG. 3.1 is performed. FIG. 3.2 shows a flowchart of a method in accordance with one or more embodiments of the invention. The method depicted in FIG. 3.2 may be used to obtain an authentication token in accordance with one or more embodiments of the invention. The method shown in FIG. 3.2 may be performed by, for example, primary resources (e.g., 122, FIG. 1.2) of a data processing device and/or an out-of-band manager (130) of a data processing device. Other components of the system illustrated in FIG. 1.1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, a request for an authentication token for an entity is sent to an authenticator.

In one or more embodiments of the invention, the entity is a remote entity that has sent a request to a data processing device to modify the configuration and corresponding state of primary resources of the data processing device. The entity may either be authorized or may not be authorized to modify configuration and corresponding state of the primary resources of the data processing device.

In one or more embodiments of the invention, the request for the authentication token is sent via an in-band connection or an out-of-band connection depending upon the entity that is sending the request for authentication token. As discussed with respect to FIG. 1.2, different components of the data processing device may communicate with other entities such as the authenticator via different connections. Thus, depending on the entity that is sending the request of step 310, different connections may be utilized.

In one or more embodiments of the invention, the request for the authentication token specifies the identity of the entity. For example, the request for the authentication token may include the data structure that identifies the entity.

In step 312, the authentication token, associated with the entity, is obtained from the authenticator. For example, the authenticator may send the authentication token in response to the request of step 310.

The method may end following step 312.

Thus, via the methods illustrated in FIGS. 3.1-3.2, different components of the data processing device may appropriately respond to remote operation requests. The appropriate response may enable other components of the data processing device to determine whether to perform operations in accordance with the remote operation requests.

As discussed above, an authenticator may be utilized to obtain authentication tokens and lists of authorized actions. FIGS. 4.1-4.2 illustrate methods that may be performed by authenticators to respond to requests from data processing devices.

FIG. 4.1 shows a flowchart of a method in accordance with one or more embodiments of the invention. The method depicted in FIG. 4.1 may be used to respond to requests that include authentication tokens in accordance with one or more embodiments of the invention. The method shown in FIG. 4.1 may be performed by, for example, an authenticator (e.g., 100, FIG. 1.1). Other components of the system illustrated in FIG. 1.1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, an authentication token is obtained.

In one or more embodiments of the invention, the authentication token is obtained as part of the request obtained from a data processing device. For example, primary resources or an out-of-band manager may send authentication token as part of a request for a list of authorized operations based on the authentication token.

In step 402, a list of authorized operations is provided based on the authentication token.

In one or more embodiments of the invention, list of authorized operations is obtained by (i) determining an identity associated with authentication token, (ii) matching the identity to one or more authorized operations specified in a user credential repository (e.g. 156, FIG. 1.3), and (iii) using the one or more authorized operations as the list of authorized operations.

To determine the identity associated with authentication token, the key used to generate the authentication token may be utilized. For example, the authentication token may have been generated based on the identity previously. At that time key that associates the authentication token with identity may have been generated. Thus, the key may be used to determine the identity associated with the authentication token. The identity associated with the authentication token may be determined via other methods without departing from the invention. For example, a reverse hash function may be used. A hash function corresponding to the reverse hash function may have been utilized to generate the authentication token previously.

The list of authorized operations may specify any number of operations. One or more of the operations may implicate a modification to configuration of a data processing device. For example, any number of operations may modify hardware settings, software settings, for more settings, and/or other characteristics of the data processing device that contribute to its configuration and corresponding state.

List of authorized operations may be provided to the entity that sent the authentication token of step 400. For example, a list of authorized operations may be sent via a message to the entity that sent the authentication token. A list of authorized operations may be sent to other entities without departing from the invention.

The method may end following step 402.

In addition to providing list of authorized operations as discussed with respect to the method of FIG. 4.1, authentication tokens may also be provided by authenticators in response to requests from data processing devices. FIG. 4.2 shows a flowchart of a method in accordance with one or more embodiments of the invention. The method depicted in FIG. 4.2 may be used to respond to requests for authentication tokens in accordance with one or more embodiments of the invention. The method shown in FIG. 4.2 may be performed by, for example, an authenticator (e.g., 100, FIG. 1.1). Other components of the system illustrated in FIG. 1.1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 410, a request for an authentication token for an entity is obtained.

In one or more embodiments of the invention, the request is obtained from a data processing device. For example, primary resources and/or an out-of-band manager may have sent the request.

In step 412, the authentication token is generated based on an identity of the entity.

In one or more embodiments of the invention, the authentication token is a data structure. The authentication token may be usable to determine an identity associated with the authentication token.

In one or more embodiments of the invention, the authentication token is a hash of an identity of the entity. For example, the authentication token may be generated by generating a hash of the identity of the entity. Authentication token may be generated using other types of functions without departing from the invention.

In step 414, the authentication token is provided in response to the request. For example, authentication token may be sent to the requesting entity of step 410.

The method may end following step 414.

Thus, via the methods illustrated in FIGS. 4.1-4.2, an authenticator may respond to requests from data processing devices to manage the states of the data processing devices. For example, the authenticator may generate authentication tokens used as part of a process for determining whether or not a remote entity is privileged to modify the configuration and corresponding state of a data processing device.

To further clarify embodiments of the invention, a non-limiting example is provided in FIGS. 5.1-5.2. Each of these figures may illustrate a similar system and/or data used by a similar system to that illustrated in FIG. 1.1 at different points in times. For the sake of brevity, only a limited number of components of the system of FIG. 1.1 are illustrated in each of FIGS. 5.1-5.2.

EXAMPLE

Consider a scenario as illustrated in FIG. 5.1 in which a data processing device (504) is providing services to other entities (not shown). To provide such services, the data processing device (504) may include primary resources (504.2) and an out-of-band manager (504.4). The aforementioned components may communicate with external entities via a network (502) using an in-band connection (502.2) and an out-of-band connection (502.4).

The data processing device (504), similar to those discussed above, may utilize authentication services provided by an authenticator (500) when evaluating when to allow operations requested by remote entities to be performed on the data processing device (504).

At a first point in time, an unauthorized entity (506) attempts to modify the state of the data processing device (504). An action diagram, illustrated in FIG. 5.2, shows the series of actions that allowed the data processing device (504) to determine that it should not comply with the request from the unauthorized entity (506).

As seen in FIG. 5.2, the unauthorized entity (506) initiated the series of actions by sending a remote operation request (510) to the out-of-band manager (504.4). The remote operation request (510) implicated action by the primary resources (504.2) of the data processing device. In response to receiving the remote operation request (510) via an out-of-band connection, the out-of-band manager (504.4) sends an authentication token request (512) to the authenticator (500). The authentication token request (512) includes an identity of the unauthorized entity (506).

In response to receiving the authentication token request (512), the authenticator (500) generates an authentication token (514). As discussed above, an authentication token may be a data structure that may be used to facilitate determining whether or not the unauthorized entity (506) is allowed to cause the data processing device to perform certain operations.

After generating the authentication token, authenticator (500) provides the authentication token (516) to the out-of-band manager (504.4). In response to receiving the authentication token, the out-of-band manager (504.4) provides the authentication token and an operation (518) indicated by the remote operation request (510) to the primary resources (504.2) via an always-on in-band connection. The out-of-band manager (504.4) does so because the primary resources (504.2) are implicated by the remote operation request (510) as opposed to the out-of-band manager (504.4).

In response to receiving the authentication token and the operation (518), the primary resources (504.2) provide the authentication token (520) to the authenticator (500). In response to being provided with the authentication token (520), the authenticator (500) determines an identity of the unauthorized entity (506) using the authentication token (520). Using the identity of the unauthorized entity (506) the authenticator (500) determines authorized operations (522) based on the identity of the unauthorized entity (506). Once authorized operations (522) are determined by the authenticator, authenticator provides the authorized operations (522) the primary resources (504.2).

In response to receiving authorized operations (522), the primary resources (504.2) compare the operation obtained when the authentication token and operation (518) were obtained to the authorized operations (522) to determine whether the operation is an authorized operation.

Because the unauthorized entity (506) does not have any privileges to modify the configuration of the data processing device and corresponding state, the authorized operations (522) indicated that no operations are authorized. Consequently, the primary resources (504.2.) reject the operation (524). Thus, via the series of actions illustrated in FIG. 5.2, the data processing device is able to ascertain that an operation, even though received over what is considered to be a secure connection, should not be performed because the entity that initiated the action was not authorized to have the data processing device perform the aforementioned operation. Had the operation been malicious in nature, the data processing device would have successfully avoided performing such a malicious action.

End of Example

Embodiments of the invention may provide a method for managing the state of a data processing device to avoid malicious actions by remote entities. To do so, the data processing device may implement a method of validating that an operation to be performed is authorized prior to performing the operation. By doing so, unauthorized operation, even though received via what is traditionally considered to be a secure communication connection such as an always-on in-band connection, may be identified and appropriately dealt with prior to performing the operation.

Thus, embodiments of the invention may address the problem of operational security within a distributed environment that may include malicious parties. Specifically, embodiments of the invention may provide a method of validating whether operations are authorized prior to performance of the operations.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a data processing device, comprising:
   obtaining, by an out-of-band manager, a remote operation request for an operation from an entity;
   obtaining, by the out-of-band manager, an authentication token for the entity, wherein the authentication token is generated by an authenticator, and a list of authorized operations is obtained from the authenticator;
   generating, by the out-of-band manager, an operation request based on the operation;
   providing, by the out-of-band manager and via an always-on in-band connection, the operation request and the authentication token to an authentication engine;
   obtaining, from the out-of-band manager and via the always-on in-band connection, the operation request and the authentication token corresponding to the operation request;
   in response to obtaining the authentication token:
      obtaining, by the authentication engine, the list of authorized operations using the authentication token;
      making a determination that the operation indicated by the operation request is allowable based on the list of authorized operations; and
      performing the operation based on the determination.

2. The method of claim 1, wherein the method further comprises:
   obtaining, via the always-on in-band connection, a second operation request and a second authentication token corresponding to the second operation request;
   in response to obtaining the second authentication token:
      obtaining a second list of authorized operations using the second authentication token;
      making a second determination that the operation indicated by the second operation request is not allowable based on the second list of authorized operations; and
      rejecting the operation based on the second determination.

3. The method of claim 1, wherein the authentication engine is operably connected to the authenticator by an in-band connection and the out-of-band manager is operably connected to the authenticator by an out-of-band connection.

4. The method of claim 1, wherein the operation impacts primary resources of the data processing device and the out-of-band manager is hosted by the data processing device.

5. A data processing device, comprising:
   primary resources;
   an out-of-band manager operably connected to the primary resources via an always-on in-band connection, wherein the out-of-band manager is programmed to:
      obtain a remote operation request for an operation from an entity;
      obtain an authentication token for the entity, wherein the authentication token is generated by an authenticator, and a list of authorized operations is obtained from the authenticator;
      generate an operation request based on the operation; and
      provide, via the always-on in-band connection, the operation request and the authentication token to an authentication engine; and
   the authentication engine programmed to:
      obtain, via the always-on in-band connection, the operation request and the authentication token corresponding to the operation request;
      in response to obtaining the authentication token:
         obtain the list of authorized operations using the authentication token;
         make a determination that the operation indicated by the operation request is allowable based on the list of authorized operations; and
         perform the operation based on the determination.

6. The data processing device of claim 5, wherein the authentication engine is further programmed to:
   obtain, via the always-on in-band connection, a second operation request and a second authentication token corresponding to the second operation request;
   in response to obtaining the second authentication token:
      obtain a second list of authorized operations using the second authentication token;
      make a second determination that the operation indicated by the second operation request is not allowable based on the second list of authorized operations; and
      reject the operation based on the second determination.

7. The data processing device of claim 5, wherein the authentication engine is operably connected to the authenticator by an in-band connection and the out-of-band manager is operably connected to the authenticator by an out-of-band connection.

8. The data processing device of claim 5, wherein the operation impacts the primary resources.

9. A non-transitory computer readable medium comprising computer readable program code, which when executed by a computer processor enables the computer processor to perform a method for managing a data processing device, the method comprising:
   obtaining, by an out-of-band manager, a remote operation request for an operation from an entity;
   obtaining, by the out-of-band manager, an authentication token for the entity, wherein the authentication token is generated by an authenticator, and a list of authorized operations is obtained from the authenticator;
   generating, by the out-of-band manager, an operation request based on the operation;

providing, by the out-of-band manager and via an always-on in-band connection, the operation request and the authentication token to an authentication engine;

obtaining, from the out-of-band manager and via the always-on in-band connection, the operation request and the authentication token corresponding to the operation request;

in response to obtaining the authentication token:
   obtaining, by the authentication engine, the list of authorized operations using the authentication token;
   making a determination that the operation indicated by the operation request is allowable based on the list of authorized operations; and
   performing the operation based on the determination.

10. The non-transitory computer readable medium of claim 9, wherein the method further comprises:
   obtaining, via the always-on in-band connection, a second operation request and a second authentication token corresponding to the second operation request;
   in response to obtaining the second authentication token:
      obtaining a second list of authorized operations using the second authentication token;
      making a second determination that the operation indicated by the second operation request is not allowable based on the second list of authorized operations; and
      rejecting the operation based on the second determination.

11. The non-transitory computer readable medium of claim 9, wherein the authentication engine is operably connected to the authenticator by an in-band connection and the out-of-band manager is operably connected to the authenticator by an out-of-band connection.

12. The non-transitory computer readable medium of claim 9, wherein the operation impacts primary resources of the data processing device and the out-of-band manager is hosted by the data processing device.

* * * * *